US011533916B2

(12) United States Patent
Trejo et al.

(10) Patent No.: US 11,533,916 B2
(45) Date of Patent: Dec. 27, 2022

(54) **METHOD OF PREPARATION OF MICROSCLEROTIA OF *BEAUVERIA BASSIANA***

(71) Applicants: YPF TECNOLOGÍA S.A., Ciudad Autónoma de Buenos Aires (AR); CONSEJO NACIONAL DE INVESTIGACIONES CIENTÍFICAS Y TÉCNICAS (CONICET), Ciudad Autónoma de Buenos Aires (AR); UNIVERSIDAD NACIONAL DE LA PLATA (UNLP), La Plata (AR)

(72) Inventors: Sebastián Alejandro Trejo, Ensenada (AR); Sebastián Reinoso, La Plata (AR); Walter Alberto Vargas, La Plata (AR); Eliana Abrahamovich, La Plata (AR); Nicolás Pedrini, La Plata (AR); Juan Roberto Girotti, La Plata (AR); Marta Patricia Juárez, La Plata (AR)

(73) Assignees: YPF TECNOLOGÍA S.A., Ciudad Autónoma de Buenos Aires (AR); CONSEJO NACIONAL DE INVESTIGACIONES CIENTÍFICAS Y TÉCNICAS (CONICET), Ciudad Autónoma de Buenos Aires (AR); UNIVERSIDAD NACIONAL DE LA PLATA (UNLP), Providence de Buenos Aires (AR)

( * ) Notice: Subject to any disclaimer, the term of this patent is extended or adjusted under 35 U.S.C. 154(b) by 92 days.

(21) Appl. No.: 16/811,381

(22) Filed: Mar. 6, 2020

(65) Prior Publication Data
US 2020/0281215 A1 Sep. 10, 2020

Related U.S. Application Data

(60) Provisional application No. 62/815,541, filed on Mar. 8, 2019.

(51) Int. Cl.
*A01N 63/30* (2020.01)
*A01N 65/00* (2009.01)

(52) U.S. Cl.
CPC .................................. *A01N 65/00* (2013.01)

(58) Field of Classification Search
None
See application file for complete search history.

(56) References Cited

U.S. PATENT DOCUMENTS

| | | | | |
|---|---|---|---|---|
| 5,968,808 A | * | 10/1999 | Jackson | C12N 1/145 435/254.1 |
| 10,932,471 B2 | * | 3/2021 | Bruck | A01N 25/30 |
| 2019/0387750 A9 | * | 12/2019 | Jackson | A01N 63/30 |
| 2020/0281206 A1 | * | 9/2020 | Trejo | A01N 65/00 |
| 2021/0007362 A1 | * | 1/2021 | Yin | C12N 3/00 |

FOREIGN PATENT DOCUMENTS

CN 102206587 * 10/2011
WO WO-2009/035925 A2 3/2009

OTHER PUBLICATIONS

Villamizar L. et al. Formation of Microsclerotia in Three Species of Beauveria and Storage Stability of a Prototype Granular Formulation. Biocontrol Science and Technology 28(12)1097-1113 2018. (Year: 2018).*

Marcarin G. et al. The Production and Uses of Beauveria bassiana as a Microbial Insecticide. World J Microbiology Biotechnology 32(177)1-26, 2016. (Year: 2016).*

* cited by examiner

*Primary Examiner* — Ralph J Gitomer
(74) *Attorney, Agent, or Firm* — Muncy, Geissler, Olds & Lowe, P.C.

(57) ABSTRACT

Disclosed is a bioinsecticide formulation comprising highly resistant *Beauveria bassiana* microsclerotia and to its use for insect control, in particular for control of insects in grain silos, and to a method of preparation of said formulation. The microsclerotia are obtained in a culture medium comprising an iron (II) compound at a concentration of approximately 0.2 g/L.

3 Claims, No Drawings

METHOD OF PREPARATION OF MICROSCLEROTIA OF *BEAUVERIA BASSIANA*

CROSS REFERENCE TO RELATED APPLICATIONS

This application claims priority of U.S. Provisional Application No. 62/815,541 filed on Mar. 8, 2019 under 35 U.S.C. § 119(e), the entire contents of all of which are hereby incorporated by reference.

TECHNICAL FIELD

The present invention relates to a bioinsecticide formulation comprising highly resistant *Beauveria bassiana* microsclerotia and to its use for insect control, in particular for control of insects in grain silos, and to a method of preparation of said formulation.

BACKGROUND

Biopesticides have been widely used for insect control in the last few decades to achieve pest handling in an environmentally friendly manner.

Among said biopesticides are insecticides derived from entomopathogenic fungi, in particular from *Metarhizium* and *Beauveria* genuses. Bioinsecticides comprising sclerotia, i.e. resting bodies consisting of a mass of hyphal threads that are highly resistant to desiccation, and in particular mirosclerotia, have also been made available. These dormant forms of entomopathogenic fungi provide bioinsecticides with improved resistance.

The entomopathogenic fungus *Beauveria bassiana* has been used as a bioinsecticide to control several pests such as termites, thrips, whiteflies, aphids and different beetles. However, its use as a bioinsecticide has been limited due to inconsistent results, mainly because of its sensitivity to abiotic stress and low virulence.

No formulations comprising highly resistant *Beauveria bassiana* microsclerotia are commercially available, and the methods of preparation that have been described are not economically viable due to the long culturing times involved. Genetic engineering has been used to obtain more resistant and virulent forms of these fungi, but without focusing on dormant, highly resistant forms of the fungus to increase the efficiency of a bioinsecticide comprising it.

In general, the use of microsclerotia as bioinsecticides has not yet been successfully exploited, mainly due to the lack of adequate and reproducible culture conditions to obtain these highly resistant forms.

WO 2009/035925 A2 describes microsclerotial propagules by entomopathogenic fungi and their use for control of insects. Experimental results showing the successful preparation of microsclerotia are described for fungi of the *Metarhizium* genus. However, it has been shown that the methods described cannot be applied to fungi of the *Beauveria* genus. In particular, the experimental protocol cannot be used to obtain microslerotia in *Beauveria bassiana*.

In the scientific literature, the preparation of microsclerotia in *Beauveria bassiana* has been described (e.g. https://doi.org/10.1111/1758-2229.12742). However, viable microsclerotia are obtained in only approximately 10 days, and their insecticidal activity has not been assessed.

There is therefore a need to provide a bioinsecticide based on highly resistant forms of *Beauveria bassiana* obtained with a more efficient method with reduced preparation times, in order to overcome the shortcomings of the prior art.

SUMMARY OF THE INVENTION

In a first aspect, it is an object of the present invention an isolated microsclerotium of *Beauvaria bassiana* obtained in a culture medium comprising iron. Preferably, said microsclerotium is obtained in a culture medium comprising an iron (II) compound. More preferably, said iron (II) compound is in a concentration of approximately 0.2 g/L. More preferably, said compound is $FeSO_4 \cdot 7H_2O$. Even more preferably, the culture medium comprises 0.4 g $KH_2PO_4$, 1.4 g $Na_2HPO_4$, 0.6 g $MgSO_4 \cdot 7H_2O$, 1.0 g KCl, 0.7 g $NH_4NO_3 \cdot 7H_2O$, 0.2 g $FeSO_4 \cdot 7H_2O$, 10 g glucose, and 5 g yeast extract in 1 L of distilled water.

In a preferred embodiment of the isolated microsclerotium of the present invention, the carbon:nitrogen ratio of said culture medium is equal to or greater than 12.5:1.

In a second aspect, it is an object of the present a method to prepare isolated microsclerotia of *Beauvaria bassiana*, wherein the microsclerotium is incubated at 26° C. for 4 days, with an agitation rate in the range of 180 to 250 rpm. Preferably, the agitation rate is 250 rpm.

In a preferred embodiment of the method of the present invention, the method to prepare an isolated microsclerotium of *Beauvaria bassiana* comprises the steps of:
culturing *Beauveria bassiana* fungi to obtain a conidium,
harvesting the conidium,
preparing conidial suspensions in a culture medium comprising an iron (II) compound to obtain a microsclerotium, and
isolating the microsclerotium.

In yet another preferred embodiment of the method of the present invention, the culture medium comprises 0.4 g $KH_2PO_4$, 1.4 g $Na_2HPO_4$, 0.6 g $MgSO_4 \cdot 7H_2O$, 1.0 g KCl, 0.7 g $NH_4NO_3 \cdot 7H_2O$, 0.2 g $FeSO_4 \cdot 7H_2O$, 10 g glucose, and 5 g yeast extract in 1 L of distilled water. Preferably, the carbon:nitrogen ratio of said culture medium is equal to or greater than 12.5:1.

In a third aspect, it is an object of the present invention a bioinsecticide formulation comprising an effective amount of the isolated microsclerotium of *Beauvaria bassiana* and an agronomically acceptable carrier. Preferably, the agronomically acceptable carrier is diatomaceous earth.

DETAILED DESCRIPTION OF THE INVENTION

The present invention will be described in further detail below.

The term "approximately" as used herein when referring to a measurable value means that it comprises variations of ±10% from the specified amount.

As used herein, the terms "comprises", "has" and "includes" and their conjugations mean "including but not limited to".

Preparation of *Beauveria bassiana* Microsclerotia

*Beauveria bassiana* was routinely cultured in potato dextrose agar plates at 26° C. for 14 days.

Conidia were harvested, suspended in 0.01% (v/v) Tween 80 in sterile distilled water, vortexed for approximately 3 min, and filtered through a 75 mm sieve to remove debris. The conidial suspensions were adjusted with a Neubauer chamber to a final concentration of $1 \times 10^7$ conidia $mL^{-1}$, and were used to inoculate in 500-mL liquid media with different carbon:nitrogen ratios (C:N) amended with ampicillin (50

µg mL$^{-1}$) in 1-L Erlenmeyer shaken flasks and then incubated at 26° C. for 4 days with orbital agitation at 250 rpm to obtain microsclerotia. The culture medium was composed of 0.4 g KH$_2$PO$_4$, 1.4 g Na$_2$HPO$_4$, 0.6 g MgSO$_4$.7H$_2$O, 1.0 g KCl, 0.7 g NH$_4$NO$_3$.7H$_2$O, 0.2 g FeSO$_4$.7H$_2$O, 10 g glucose, and 5 g yeast extract in 1 L of distilled water. The addition of Fe$^{2+}$ is crucial for the microsclerotial formation (Table 1). The fungus cultured in this medium with a lower agitation rate of 180 rpm and without iron supplementation produced only mycelium but not microsclerotia.

Microsclerotia production was assayed also in media with different C:N ratios (Table 2). Carbon to nitrogen ratios were determined by considering 40% C in glucose, 45% C and 8% N in yeast extract, and 13.6% N in NH$_4$NO$_3$.7H$_2$O. All cultures (500 mL of each medium supplemented with ampicillin in 1-L Erlenmeyer shaken flasks) were inoculated with 1 mL of 1×10$^7$ conidia mL$^{-1}$ and incubated during 4 days at 26° C. and 250 rpm.

At the end of the fermentation process, fungal biomass from the culture broth was retrieved by centrifugation for 20 min at 7600×g and washed with sterile distiller water to remove media components.

Fresh biomass samples containing microsclerotia were placed in desiccators with activated silica gel at 4° C. for 2-3 days until moisture content was reduced to 5% (w/w). Fungal cells harvested from 1 mL of culture broth was dried until reaching constant weight, and dried biomass production was further calculated as mg of dry mass mL$^{-1}$ of culture broth. Additionally, 25 mL of each microsclerotia culture medium was similarly dried and 30 mg of that dried biomass were plated on nutrient-free water-agar medium (2% w/v) with ampicillin for 14 days at 26° C. Fungal growth was monitored daily and conidia produced by microsclerotia were harvested and suspended in sterile 0.01% Tween 80. Conidial production from the suspension was determined with a Neubauer chamber at 400× magnification with a phase contrast, and then expressed as total conidia per gram of dry biomass.

To assess conidial viability from sporulated microsclerotia on water-agar plates, the suspension was also used to inoculate PDA plates and germination was recorded by microscopic examination at 400× after 24 h of incubation at 26° C. in total darkness. For microsclerotia concentration measurements, 1 mL of culture broth from each test liquid media was diluted to 1/10 and 100 µl were placed on glass slides (26 mm×76 mm) and covered with a coverslip (20 mm×20 mm) and then observed on the microscope to count microsclerotia. Only discrete pigmented aggregates larger than 100 µm were counted as microsclerotia.

TABLE 1

Comparison of culture media with different carbon:nitrogen ratio (C:N) and the addition of Fe$^{2+}$ to the media in *Beauveria bassiana* microsclerotia production (+).

| | Microsclerotia producing media | |
|---|---|---|
| C:N | Without Fe$^{2+}$ | With Fe$^{2+}$ |
| 5:1 | − | − |
| 12.5:1 | − | + |
| 30:1 | − | + |
| 50:1 | − | + |

TABLE 2

Glucose concentration modified from Complete Minimal (CM) medium to obtain different C:N ratios to study microsclerotia production in liquid cultures of *Beauveria bassiana*.

| Media | Glucose (g L$^{-1}$) | Total carbon (g L$^{-1}$) | C:N |
|---|---|---|---|
| 1 | 0.625 | 10 | 5:1 |
| 2 | 10 | 25 | 12.5:1 |
| 3 | 31.9 | 60 | 30:1 |
| 4 | 56.9 | 100 | 50:1 |

The conidial suspensions used to obtain the microsclerotia were incubated for periods longer than 4 days and up to 10 days, without significant changes in the assessed microsclerotia production. The method of the present invention is thus more efficient, in that incubation times are reduced to 4 days with respect to the methods of the prior art.

Preparation of Bioinsecticide Formulation

A granular formulation was prepared mixing 100 mL of culture broth containing microsclerotia with 5 g of sterile diatomaceous earth and dried in a desiccator with activated silica or vacuum chamber. Then, granules were disrupted into a powder with mortar and pestle to assay their insecticidal activity.

Insecticidal activity was assessed against *Tribolium castaneum* adult insects and larvae and *Tenebrio molitor* adult insects.

The obtained bioinsecticide formulation can be successfully used to control insects, in particular wheat weevils. The formulation can be used in silos of stored grains for storing wheat and what flour.

The bioinsecticide formulations of the present invention based on *Beauveria bassiana* microsclerotia have a controlled released with respect to conidia-based formulations of the prior art.

The invention claimed is:

1. A method to prepare an isolated microsclerotium of *Beauveria bassiana*, comprising:

incubating the microsclerotium at 26° C. for 4 days with an agitation rate of 250 rpm in a culture medium comprising 0.4 g KH$_2$PO$_4$, 1.4 g Na$_2$HPO$_4$, 0.6 g MgSO$_4$.7H$_2$O, 1.0 g KCl, 0.7 g NH$_4$NO$_3$.7H$_2$O, 0.2 g FeSO$_4$.7H$_2$O, 10 g glucose, and 5 g yeast extract in 1 L of distilled water.

2. The method according to claim 1, further comprising:

culturing *Beauveria bassiana* fungi to obtain a conidium, harvesting the conidium, preparing conidial suspensions, and isolating the microsclerotium.

3. The method according to claim 2, wherein the carbon:nitrogen ratio of said culture medium is equal to or greater than 12.5:1.

* * * * *